(12) United States Patent
Yamaguchi et al.

(10) Patent No.: US 11,705,253 B2
(45) Date of Patent: Jul. 18, 2023

(54) SUPERCONDUCTING WIRE AND SUPERCONDUCTING COIL

(71) Applicant: Sumitomo Electric Industries, Ltd., Osaka (JP)

(72) Inventors: Takashi Yamaguchi, Osaka (JP); Tatsuoki Nagaishi, Osaka (JP); Masaya Konishi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 881 days.

(21) Appl. No.: 16/482,342

(22) PCT Filed: Feb. 14, 2017

(86) PCT No.: PCT/JP2017/005299
§ 371 (c)(1),
(2) Date: Jul. 31, 2019

(87) PCT Pub. No.: WO2018/150456
PCT Pub. Date: Aug. 23, 2018

(65) Prior Publication Data
US 2020/0051714 A1   Feb. 13, 2020

(51) Int. Cl.
*H01B 12/06* (2006.01)
*H01F 6/02* (2006.01)
*H01F 6/06* (2006.01)
*H01F 41/04* (2006.01)
*H01F 41/12* (2006.01)

(52) U.S. Cl.
CPC .............. *H01B 12/06* (2013.01); *H01F 6/02* (2013.01); *H01F 6/06* (2013.01); *H01F 41/048* (2013.01); *H01F 41/122* (2013.01)

(58) Field of Classification Search
CPC ...................................................... H01B 12/06
See application file for complete search history.

(56) References Cited

U.S. PATENT DOCUMENTS

| 2011/0244234 A1 | 10/2011 | Taneda et al. | |
| 2014/0155269 A1* | 6/2014 | Daibo | H01B 3/445 |
| | | | 505/211 |

FOREIGN PATENT DOCUMENTS

| CN | 102165536 A | 8/2011 |
| CN | 103733276 A | 4/2014 |
| JP | 2008-244249 A | 10/2008 |
| JP | 2011-198469 A | 10/2011 |
| JP | 2014-22693 A | 2/2014 |

(Continued)

*Primary Examiner* — Paul A Wartalowicz
(74) *Attorney, Agent, or Firm* — Faegre Drinker Biddle & Reath LLP

(57) ABSTRACT

A superconducting wire according to one embodiment of the present disclosure includes: a substrate having a first surface and a second surface; a superconducting layer having a third surface and a fourth surface; and respective coating layers. The second surface is opposite to the first surface. The fourth surface is opposite to the third surface. The superconducting layer is disposed on the substrate such that the third surface faces the second surface. The respective coating layers are disposed on the first surface and the fourth surface. Adhesion strength between the substrate and the coating layer disposed on the first surface is lower than adhesion strength between the superconducting layer and the coating layer disposed on the fourth surface.

5 Claims, 6 Drawing Sheets

(56) References Cited

FOREIGN PATENT DOCUMENTS

| | | |
|---|---|---|
| JP | 2015-198009 A | 11/2015 |
| JP | 2016-134418 A | 7/2016 |

* cited by examiner

SUPERCONDUCTING WIRE AND SUPERCONDUCTING COIL

TECHNICAL FIELD

The present invention relates to a superconducting wire and a superconducting coil.

BACKGROUND ART

Conventionally, a superconducting wire described in Japanese Patent Laying-Open No. 2008-244249 (Patent Literature 1) has been known. The superconducting wire described in Patent Literature 1 includes: a substrate; a superconducting layer disposed on the substrate; and stabilization layers that coat the substrate and the superconducting layer. The superconducting wire described in Patent Literature 1 is wound and is impregnated with an impregnating material such as an epoxy resin, thereby obtaining a superconducting coil. In the superconducting coil described in Patent Literature 1, it has been known that a superconducting property may be deteriorated due to the superconducting layer being broken by thermal stress resulting from a difference between the thermal expansion coefficient of the impregnating material and the thermal expansion coefficient of the superconducting wire.

As configurations for preventing the above-described breakage of the superconducting layer due to the thermal stress resulting from the difference in thermal expansion coefficient, the following configurations have been conventionally known: the configuration of an insulation coating oxide superconducting wire described in Japanese Patent Laying-Open No. 2011-198469 (Patent Literature 2); the configuration of a composite tape described in Japanese Patent Laying-Open No. 2014-22693 (Patent Literature 3); and the configuration of a superconducting wire described in Japanese Patent Laying-Open No. 2016-134418 (Patent Literature 4).

The insulation coating oxide superconducting wire described in Patent Literature 2 includes: an oxide superconducting wire material; an insulating material layer that coats the entire surface of the oxide superconducting wire material; and a releasing material layer provided on the insulating material layer. The insulation coating oxide superconducting wire described in Patent Literature 2 is wound and is impregnated with a thermosetting resin, thereby obtaining a coil. Also in the coil described in Patent Literature 2, thermal stress resulting from a difference between the thermal expansion coefficient of the thermosetting resin and the thermal expansion coefficient of the insulation coating oxide superconducting wire is caused during cooling. In the coil described in Patent Literature 2, the thermosetting resin and the releasing material layer are readily detached from each other at an interface therebetween, whereby the thermal stress is less likely to act on the superconducting layer and the superconducting property is less likely to be deteriorated due to breakage of the superconducting layer.

The composite tape described in Patent Literature 3 includes a superconducting tape wire, an insulating tape wire, and a releasing layer. The releasing layer is disposed on at least one of the superconducting tape wire and the insulating tape wire. The composite tape described in Patent Literature 3 is wound and is impregnated with an epoxy resin, thereby obtaining a coil. Also in the coil described in Patent Literature 3, thermal stress is caused during cooling. In the coil described in Patent Literature 3, the epoxy resin and the releasing layer are detached from each other at an interface therebetween, whereby the superconducting property is less likely to be deteriorated due to the superconducting layer being broken by the thermal stress.

The superconducting wire described in Patent Literature 4 includes a metal substrate, a superconducting layer, and a carbon layer. The superconducting layer is disposed on the metal substrate. The carbon layer is disposed on at least one of the superconducting layer and the metal substrate. The breaking strength of the carbon layer is lower than that of the superconducting layer. The superconducting wire described in Patent Literature 4 is wound and is impregnated with an epoxy resin composition, thereby obtaining a coil. Also in the coil described in Patent Literature 4, thermal stress resulting from a difference between the thermal expansion coefficient of the epoxy resin composition and the thermal expansion coefficient of the superconducting wire is caused during cooling. With this thermal stress, the carbon layer is readily fractured. Accordingly, the superconducting property is less likely to be deteriorated due to the superconducting layer being broken by this thermal stress.

CITATION LIST

Patent Literature

PTL 1: Japanese Patent Laying-Open No. 2008-244249
PTL 2: Japanese Patent Laying-Open No. 2011-198469
PTL 3: Japanese Patent Laying-Open No. 2014-22693
PTL 4: Japanese Patent Laying-Open No. 2016-134418

SUMMARY OF INVENTION

A superconducting wire according to one embodiment of the present disclosure includes: a substrate having a first surface and a second surface; a superconducting layer having a third surface and a fourth surface; and respective coating layers. The second surface is opposite to the first surface. The fourth surface is opposite to the third surface. The superconducting layer is disposed on the substrate such that the third surface faces the second surface. The respective coating layers are disposed on the first surface and the fourth surface. Adhesion strength between the substrate and the coating layer disposed on the first surface is lower than adhesion strength between the superconducting layer and the coating layer disposed on the fourth surface.

A superconducting coil according to the present disclosure includes the superconducting wire according to the present disclosure, and an insulator. The superconducting wire is wound to have a spiral shape with a space being interposed between windings of the superconducting wire. The space is filled with the insulator. The insulator has a thermal expansion coefficient larger than a thermal expansion coefficient of the superconducting layer.

DETAILED DESCRIPTION

Figure 1:
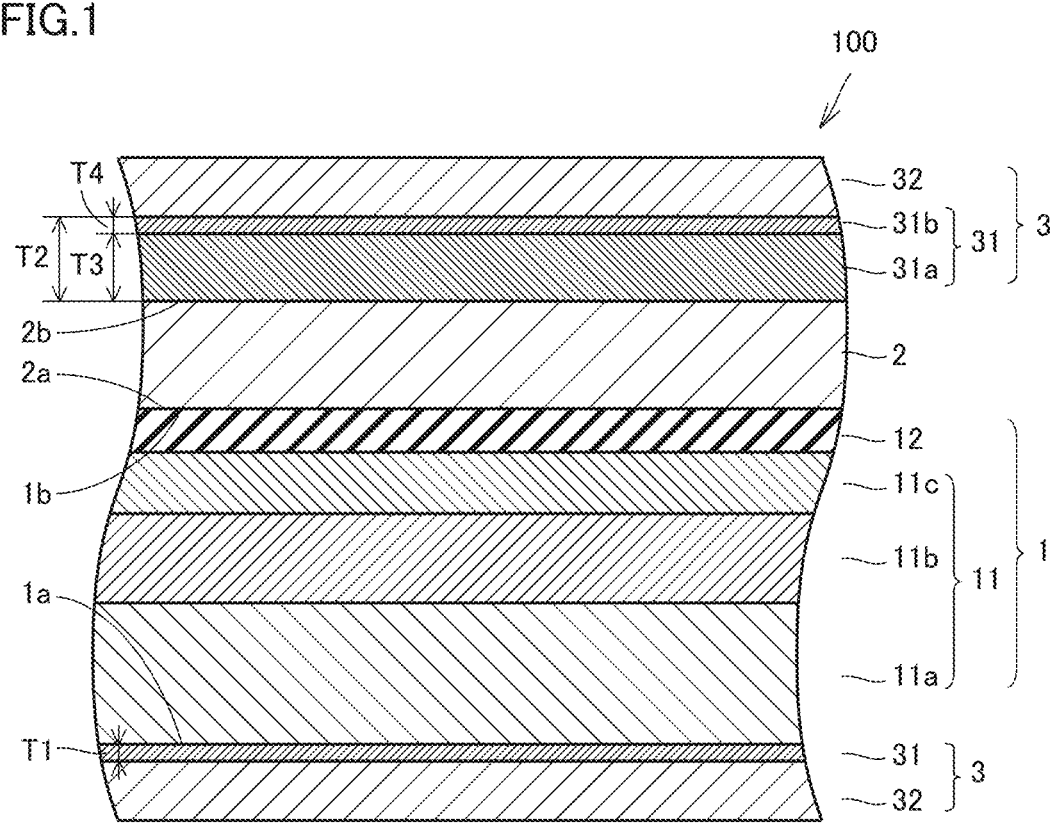
FIG. 1 is a cross sectional view of a superconducting wire 100 according to an embodiment in a cross section parallel to a longitudinal direction thereof.

Problems to be Solved by the Present Disclosure

For the insulation coating superconducting wire and the coil employing the insulation coating superconducting wire in Patent Literature 2, it is necessary to add a new step of forming the releasing material layer. Also for the composite tape and the coil employing the composite tape in Patent Literature 3, it is necessary to add a new step of forming the releasing layer. Also for the superconducting wire and the coil employing the superconducting wire in Patent Literature 4, it is necessary to add a new step of forming the carbon layer. Thus, for the respective superconducting wires and the respective coils employing the superconducting wires in Patent Literature 2 to Patent Literature 4, manufacturing processes are complicated, disadvantageously.

A superconducting wire and a superconducting coil according to the present disclosure have been made in view of the above-described problem of the conventional techniques. More specifically, the present disclosure is to provide a superconducting wire and a superconducting coil, in each of which a superconducting property can be suppressed from being deteriorated by thermal stress resulting from a difference between the thermal expansion coefficient of an insulator and the thermal expansion coefficient of the superconducting wire without complicating a manufacturing process.

Advantageous Effect of the Present Disclosure

According to the superconducting wire and the superconducting coil according to the present disclosure, a superconducting property can be suppressed from being deteriorated by thermal stress resulting from a difference between the thermal expansion coefficient of an insulator and the thermal expansion coefficient of the superconducting wire without complicating a manufacturing process.

Description of Embodiments

First, embodiments of the present disclosure are listed and described.

(1) A superconducting wire according to one embodiment of the present disclosure includes: a substrate having a first surface and a second surface; a superconducting layer having a third surface and a fourth surface; and respective coating layers. The second surface is opposite to the first surface. The fourth surface is opposite to the third surface. The superconducting layer is disposed on the substrate such that the third surface faces the second surface. The respective coating layers are disposed on the first surface and the fourth surface. Adhesion strength between the substrate and the coating layer disposed on the first surface is lower than adhesion strength between the superconducting layer and the coating layer disposed on the fourth surface.

In the manufacturing of the superconducting wire according to (1), no new step of forming a carbon layer or the like is required. Hence, according to the superconducting wire according to (1), the manufacturing process is not complicated. Moreover, when forming a superconducting coil, the superconducting wire according to (1) is shaped into a spiral shape and a space between windings of the superconducting wire is filled with an insulator. According to the superconducting wire according to (1), the coating layer and the substrate are detached from each other on the first surface distant away from the superconducting layer before the superconducting layer is broken due to the thermal stress resulting from the difference between the thermal expansion coefficient of the superconducting wire and the thermal expansion coefficient of the insulating material. Therefore, according to the superconducting wire according to (1), the superconducting property can be suppressed from being deteriorated.

(2) In the superconducting wire according to (1), the coating layers may have respective stabilization layers. The respective stabilization layers are disposed on the first surface and the fourth surface.

According to the superconducting wire according to (2), adhesion between the superconducting layer and each coating layer is improved to allow the coating layer to sufficiently exhibit a function of protecting the superconducting layer.

(3) In the superconducting wire according to (2), a thickness of the stabilization layer disposed on the first surface may be smaller than a thickness of the stabilization layer disposed on the fourth surface.

The function of protecting the superconducting layer is increased as the thickness of the coating layer disposed on the fourth surface located at the superconducting layer side is larger, even when the total of the thickness of the coating layer disposed on the first surface and the thickness of the coating layer disposed on the fourth surface is the same. Hence, according to the superconducting wire according to (3), it becomes possible to improve the function of protecting the superconducting layer by the coating layer.

(4) In the superconducting wire according to (2), the stabilization layer disposed on the first surface may be constituted of a single layer, and the stabilization layer disposed on the fourth surface may be constituted of a plurality of layers.

According to the superconducting wire according to (4), the coating layer is facilitated to be detached from the first surface side more securely.

(5) In the superconducting wire according to (4), the stabilization layer disposed on the first surface may be constituted of a strike plating layer, and the stabilization layer disposed on the fourth surface may be constituted of a sputtering layer disposed on the fourth surface and a strike plating layer disposed on the sputtering layer.

According to the superconducting wire according to (5), adhesion strength between the strike plating layer and the substrate is very low, whereby the coating layer and the substrate are very readily detached from each other at an interface therebetween. Therefore, according to the superconducting wire according to (5), the superconducting property can be further suppressed from being deteriorated by thermal stress resulting from a difference between the thermal expansion coefficient of the insulator and the thermal expansion coefficient of the superconducting wire.

(6) A superconducting coil according to one embodiment of the present disclosure includes: the superconducting wire recited in any one of (1) to (5); and an insulator having a thermal expansion coefficient larger than a thermal expansion coefficient of the superconducting layer. The superconducting wire is wound to have a spiral shape with a space being interposed between windings of the superconducting wire. The space is filled with the insulator.

According to the superconducting coil according to (6), the superconducting property can be suppressed from being deteriorated by thermal stress resulting from a difference between the thermal expansion coefficient of the insulator and the thermal expansion coefficient of the superconducting wire without complicating a manufacturing process.

Details of Embodiments of the Present Disclosure

Next, details of the embodiments will be described.

Configuration of Superconducting Wire According to Embodiment

The following describes a configuration of a superconducting wire according to an embodiment with reference to figures. It should be noted that the same or corresponding portions in the figures are given the same reference characters. Moreover, at least parts of the embodiment described below may be appropriately combined.

FIG. 1 is a cross sectional view of a superconducting wire 100 according to the embodiment in a cross section parallel to a longitudinal direction thereof. As shown in FIG. 1, superconducting wire 100 according to the embodiment has a substrate 1, a superconducting layer 2, and coating layers 3.

Substrate 1 preferably has a tape-like shape having a thickness smaller than the length thereof in the longitudinal direction. Substrate 1 has a first surface 1a and a second surface 1b. Second surface 1b is a surface opposite to first surface 1a. Substrate 1 may be constituted of a plurality of layers. More specifically, substrate 1 may include a substrate layer 11 and an intermediate layer 12. Substrate layer 11 is located at the first surface 1a side, and intermediate layer 12 is located at the second surface 1b side.

Substrate layer 11 may be constituted of a plurality of layers. For example, substrate layer 11 is constituted of a first layer 11a, a second layer 11b, and a third layer 11c. First layer 11a, second layer 11b, and third layer 11c are composed of different materials. Stainless steel is used for first layer 11a, for example. Copper (Cu) is used for second layer 11b, for example. Nickel (Ni) is used for third layer 11c, for example.

Intermediate layer 12 is a layer serving as a buffer for forming superconducting layer 2 on substrate 1. Intermediate layer 12 preferably has a uniform crystal orientation. Moreover, for intermediate layer 12, a material having a small lattice constant mismatch with respect to the material of superconducting layer 2 is used. More specifically, for intermediate layer 12, cerium oxide ($CeO_2$) or yttria stabilized zirconia (YSZ) is used.

Superconducting layer 2 is a layer containing a superconductor. A material used for superconducting layer 2 is a rare-earth-based oxide superconductor, for example. For example, the rare-earth-based oxide superconductor used for superconducting layer 2 is REBCO ($REBa_2Cu_3O_y$, where RE represents a rare earth such as yttrium (Y), praseodymium (Pr), neodymium (Nd), samarium (Sm), europium (Eu), gadolinium (Gd), holmium (Ho), or ytterbium (Yb)).

Superconducting layer 2 has a third surface 2a and a fourth surface 2b. Fourth surface 2b is a surface opposite to third surface 2a. Superconducting layer 2 is disposed on substrate 1. More specifically, superconducting layer 2 is disposed on substrate 1 such that third surface 2a faces second surface 1b. Regarding this, from another viewpoint, it is said that superconducting layer 2 is disposed on intermediate layer 12.

Coating layers 3 are respective layers that coat substrate 1 and superconducting layer 2. Respective coating layers 3 are disposed on first surface 1a of substrate 1 and fourth surface 2b of superconducting layer 2. Adhesion strength between substrate 1 and coating layer 3 disposed on first surface 1a is lower than adhesion strength between superconducting layer 2 and coating layer 3 disposed on fourth surface 2b. Regarding this, from another viewpoint, it is said that coating layer 3 is more likely to be detached from substrate 1 at the first surface 1a side as compared with the fourth surface 2b side. It should be noted that the adhesion strength between substrate 1 and coating layer 3 disposed on the first surface is lower than the strength of superconducting layer 2.

The adhesion strength between substrate 1 and coating layer 3 disposed on first surface 1a and the adhesion strength between superconducting layer 2 and coating layer 3 disposed on fourth surface 2b are measured in accordance with a method defined in JIS K 6854-2.

Each of coating layers 3 has a stabilization layer 31 and a protective layer 32. Stabilization layer 31 is a layer for protecting superconducting layer 2, dissipating locally generated heat in superconducting layer 2, and bypassing current upon occurrence of quench (phenomenon in which transition is made from a superconducting state to a normal conducting state) in superconducting layer 2. Stabilization layers 31 are disposed on first surface 1a and fourth surface 2b. A material used for each stabilization layer 31 is silver (Ag), for example.

Stabilization layer 31 disposed on first surface 1a is preferably constituted of a single layer. More preferably, stabilization layer 31 disposed on first surface 1a is a strike plating layer. The strike plating layer is a layer formed by strike plating.

Stabilization layer 31 disposed on fourth surface 2b is preferably constituted of a plurality of layers. Stabilization layer 31 disposed on fourth surface 2b is more preferably constituted of two layers. Specifically, stabilization layer 31 disposed on fourth surface 2b is preferably constituted of a sputtering layer 31a and a strike plating layer 31b.

Sputtering layer 31a is disposed on fourth surface 2b. Strike plating layer 31b is disposed on sputtering layer 31a. Sputtering layer 31a is a layer formed by sputtering.

Stabilization layer 31 disposed on first surface 1a has a first thickness T1. Stabilization layer 31 disposed on fourth surface 2b has a second thickness T2. First thickness T1 is smaller than second thickness T2. First thickness T1 is less than or equal to 5 μm, for example.

Sputtering layer 31a has a third thickness T3. Strike plating layer 31b has a fourth thickness T4. Third thickness T3 is more than or equal to 2 μm and less than or equal to 20 μm, for example. Fourth thickness T4 is less than or equal to 5 μm, for example. When stabilization layer 31 disposed on fourth surface 2b is constituted of sputtering layer 31a and strike plating layer 31b, second thickness T2 is equal to a total of third thickness T3 and fourth thickness T4. Therefore, in this case, second thickness T2 is more than or equal to 2 μm and less than or equal to 25 μm, for example.

Protective layer 32 is a layer for protecting stabilization layer 31. Protective layer 32 is disposed on stabilization layer 31. A material used for protective layer 32 is Cu, for example.

It should be noted that although not shown in FIG. 1, coating layers 3 (stabilization layers 31 and protective layers 32) may coat end surfaces of superconducting wire 100 according to the embodiment in a direction perpendicular to the longitudinal direction.

Configuration of Superconducting Coil According to Embodiment

Figure 2:
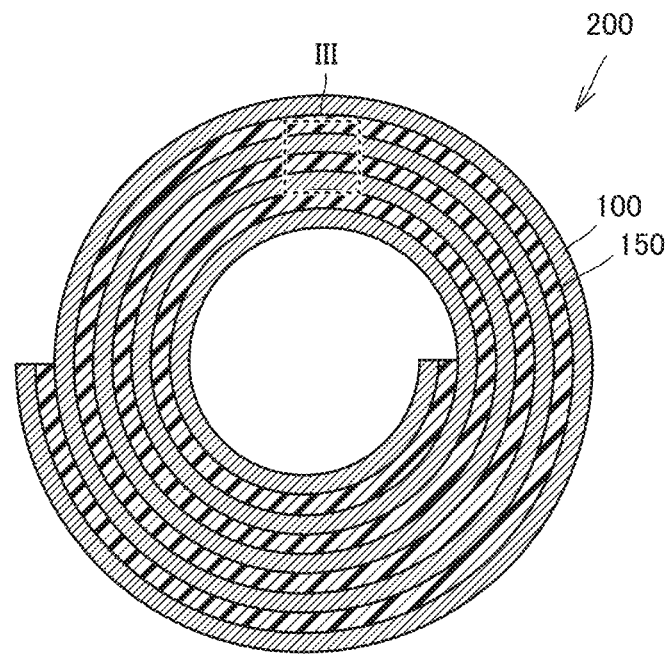
FIG. 2 is a cross sectional view of a superconducting coil 200 according to the embodiment in a cross section perpendicular to a coil axis thereof.

The following describes a configuration of a superconducting coil 200 according to the embodiment with reference to figures. FIG. 2 is a cross sectional view of superconducting coil 200 according to the embodiment in a cross section perpendicular to a coil axis thereof. As shown in FIG. 2, superconducting coil 200 according to the embodiment has superconducting wire 100 and an insulator 150.

Superconducting wire 100 has a spiral shape centering on the coil axis. That is, superconducting wire 100 is wound around the coil axis. Superconducting wire 100 is wound with a space being interposed between windings of superconducting wire 100.

Figure 3:
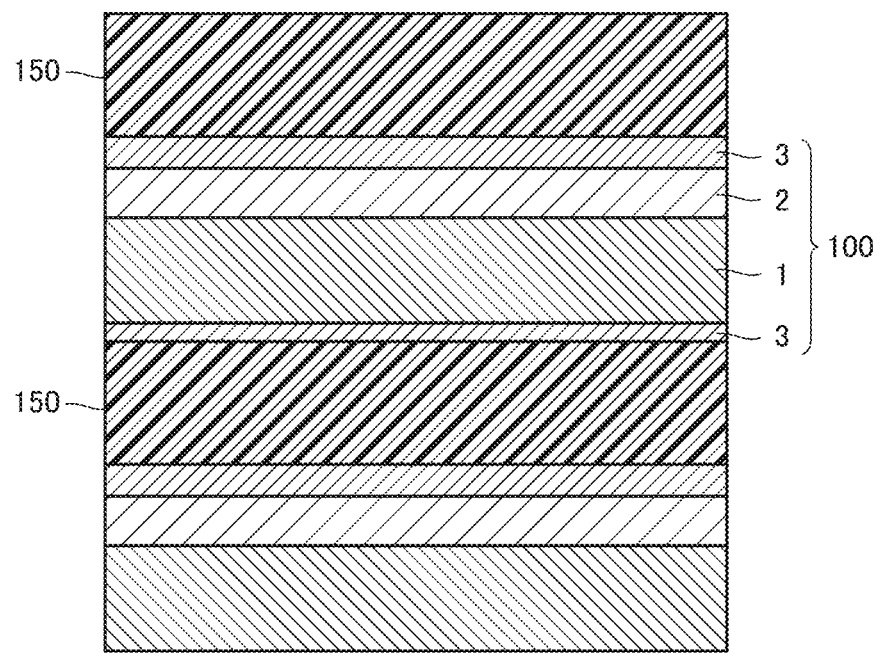
FIG. 3 is an enlarged cross sectional view of a region III of FIG. 2.

The space between the windings of superconducting wire 100 is filled with insulator 150. Accordingly, the windings of superconducting wire 100 are insulated from each other and are fixed relative to each other. FIG. 3 is an enlarged cross sectional view of a region III of FIG. 2. As shown in FIG. 3, superconducting wire 100 is sandwiched by insulator 150.

A thermosetting resin is used for insulator 150, for example. The thermosetting resin used for insulator 150 preferably has a low viscosity to such an extent that the thermosetting resin in a state before being set can be introduced into the space between the windings of superconducting wire 100. The thermosetting resin used for insulator 150 is an epoxy resin, for example.

Insulator 150 has a thermal expansion coefficient larger than that of superconducting wire 100. Specifically, insulator 150 has a thermal expansion coefficient larger than that of superconducting layer 2. The thermal expansion coefficient of insulator 150 may be larger than the thermal expansion coefficient of substrate 1. For example, when the epoxy resin is used for insulator 150, the size of insulator 150 is contracted by about 1% when cooling from a room temperature to 77 K. On the other hand, when substrate 1 is cooled in a similar manner, the size of substrate 1 is contracted by about 0.3%. When superconducting layer 2 is cooled in a similar manner, the size contraction ratio of superconducting layer 2 is less than 0.3%.

Method for Manufacturing Superconducting Wire According to Embodiment

Figure 4:
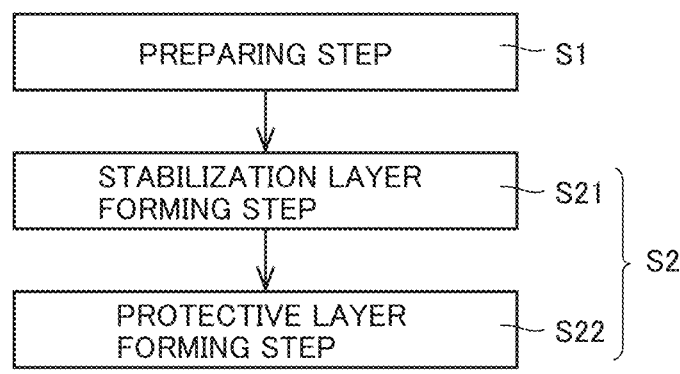
FIG. 4 is a flowchart of a method for manufacturing superconducting wire 100 according to the embodiment.

The following describes a method for manufacturing superconducting wire 100 according to the embodiment. FIG. 4 is a flowchart of the method for manufacturing superconducting wire 100 according to the embodiment. As shown in FIG. 4, the method for manufacturing superconducting wire 100 according to the embodiment has a preparing step S1 and a coating layer forming step S2. Coating layer forming step S2 includes a stabilization layer forming step S21 and a protective layer forming step S22.

Figure 5A:
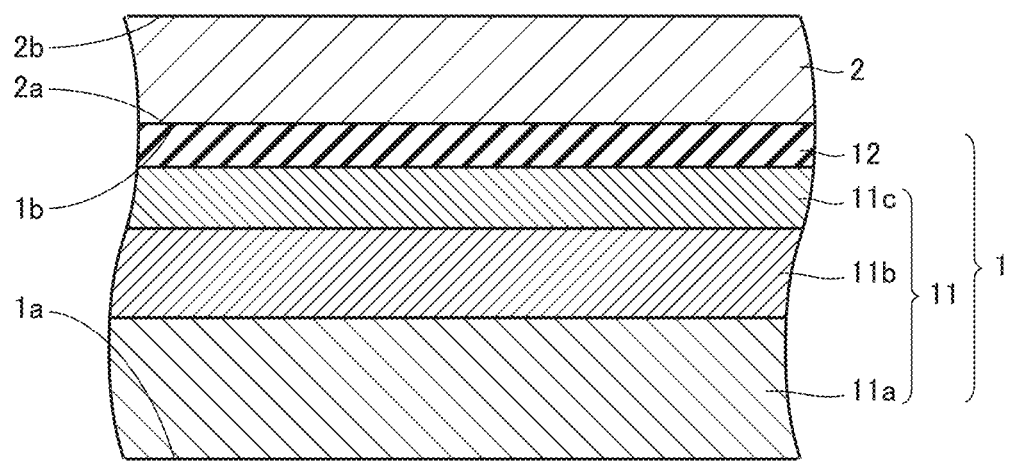
FIG. 5A is a cross sectional view of superconducting wire 100 in the cross section parallel to the longitudinal direction after ending a preparing step S1 and before performing a stabilization layer forming step S21.

FIG. 5A is a cross sectional view of superconducting wire 100 in the cross section parallel to the longitudinal direction after ending preparing step S1 and before performing stabilization layer forming step S21. In preparing step S1, as shown in FIG. 5A, superconducting layer 2 is formed on substrate 1. More specifically, intermediate layer 12 is formed on substrate layer 11, and superconducting layer 2 is formed on intermediate layer 12. Intermediate layer 12 is formed on substrate layer 11 and superconducting layer 2 is formed on intermediate layer 12 by conventionally known methods.

Figure 5B:
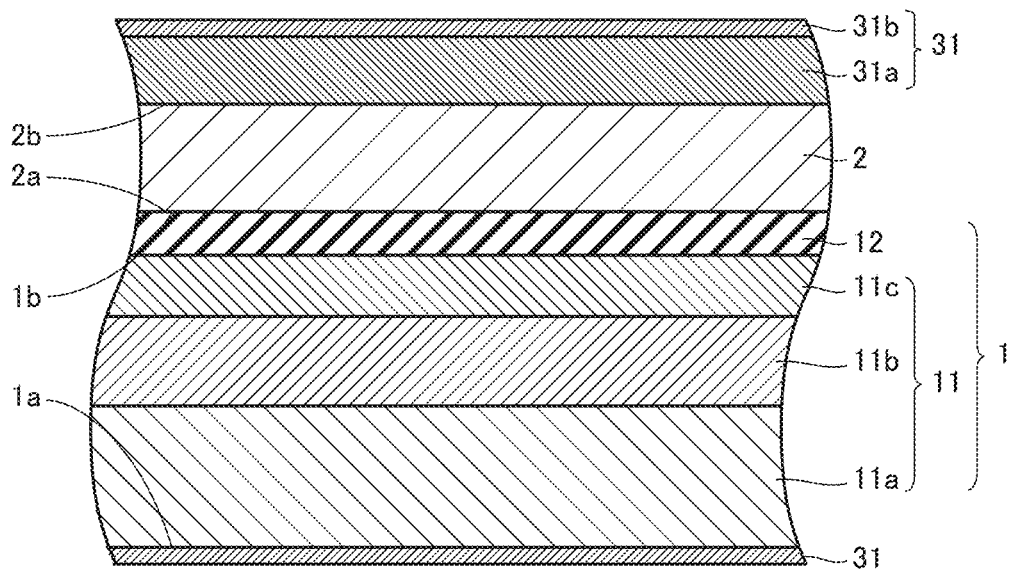
FIG. 5B is a cross sectional view of superconducting wire 100 in the cross section parallel to the longitudinal direction after ending stabilization layer forming step S21 and before performing a protective layer forming step S22.

FIG. 5B is a cross sectional view of superconducting wire 100 in the cross section parallel to the longitudinal direction after ending stabilization layer forming step S21 and before performing protective layer forming step S22. As shown in FIG. 5B, in stabilization layer forming step S21, stabilization layers 31 are formed on first surface 1a and fourth surface 2b.

In stabilization layer forming step S21, first, sputtering is performed. Sputtering is performed to the fourth surface 2b side. Accordingly, sputtering layer 31a, which is a portion of stabilization layer 31 disposed on fourth surface 2b, is formed on fourth surface 2b. It should be noted that since sputtering is not performed to the first surface 1a side, sputtering layer 31a is not formed at the first surface 1a side. Regarding this, from another viewpoint, it is said that stabilization layer forming step S21 is a step in which the sputtering to the first surface 1a side is excluded from a conventionally known step of forming stabilization layers 31.

In stabilization layer forming step S21, second, strike plating is performed. The strike plating is performed to both the first surface 1a side and the fourth surface 2b side. Accordingly, the strike plating layer serving as stabilization layer 31 disposed on first surface 1a and strike plating layer 31b serving as a portion of stabilization layer 31 disposed on fourth surface 2b are formed.

Figure 5C:
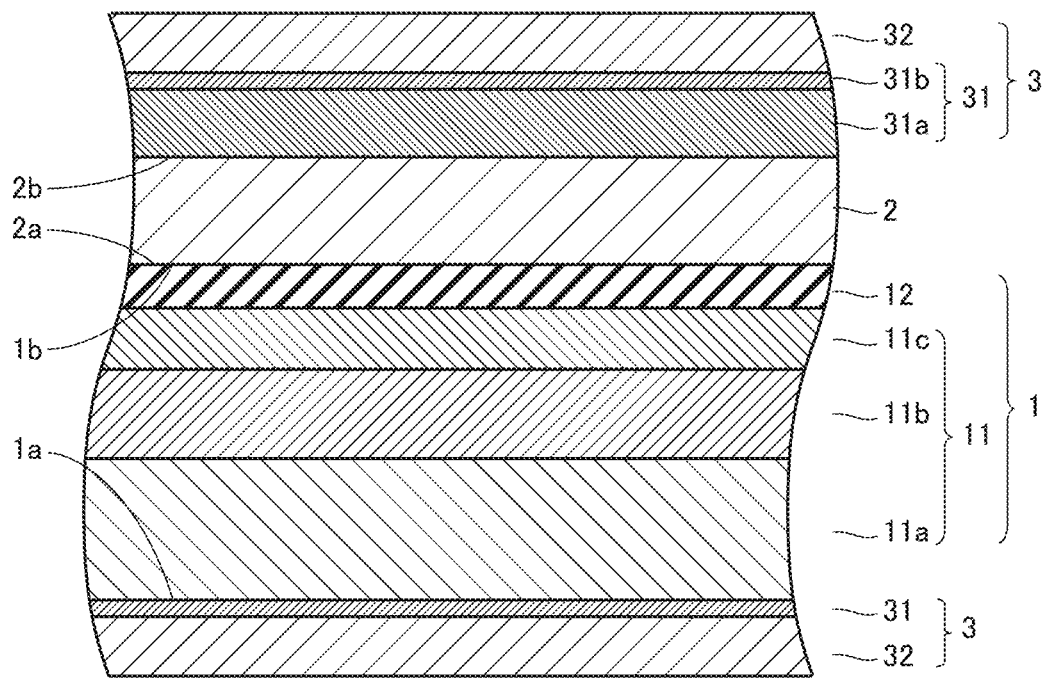
FIG. 5C is a cross sectional view of superconducting wire 100 in the cross section parallel to the longitudinal direction after ending protective layer forming step S22.

FIG. 5C is a cross sectional view of superconducting wire 100 in the cross section parallel to the longitudinal direction after ending protective layer forming step S22. As shown in FIG. 5C, protective layers 32 are formed on stabilization layers 31. Protective layers 32 are formed by a conventionally known method such as plating. It should be noted that since the strike plating layer is disposed on first surface 1a, substrate 1 is suppressed from being eroded by plating liquid or the like when forming protective layers 32.

Method for Manufacturing Superconducting Coil According to Embodiment

Figure 6:
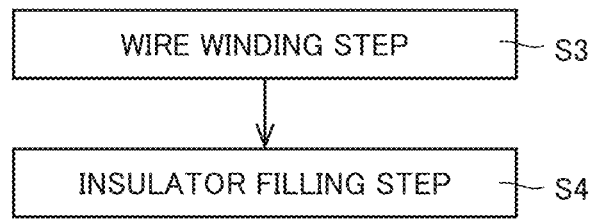
FIG. 6 is a flowchart of a method for manufacturing superconducting coil 200 according to the embodiment.

The following describes a method for manufacturing superconducting coil 200 according to the embodiment. FIG. 6 is a flowchart of the method for manufacturing superconducting coil 200 according to the embodiment. As shown in FIG. 6, the method for manufacturing superconducting coil 200 according to the embodiment includes a wire winding step S3 and an insulator filling step S4.

In wire winding step S3, superconducting wire 100 is wound around a spool, for example. Accordingly, superconducting wire 100 is shaped to have a spiral shape. In insulator filling step S4, an epoxy resin or the like is introduced into a space between the windings of superconducting wire 100 and is thermally set, whereby the space between the windings of superconducting wire 100 shaped to have the spiral shape is filled with insulator 150.

Figure 7:
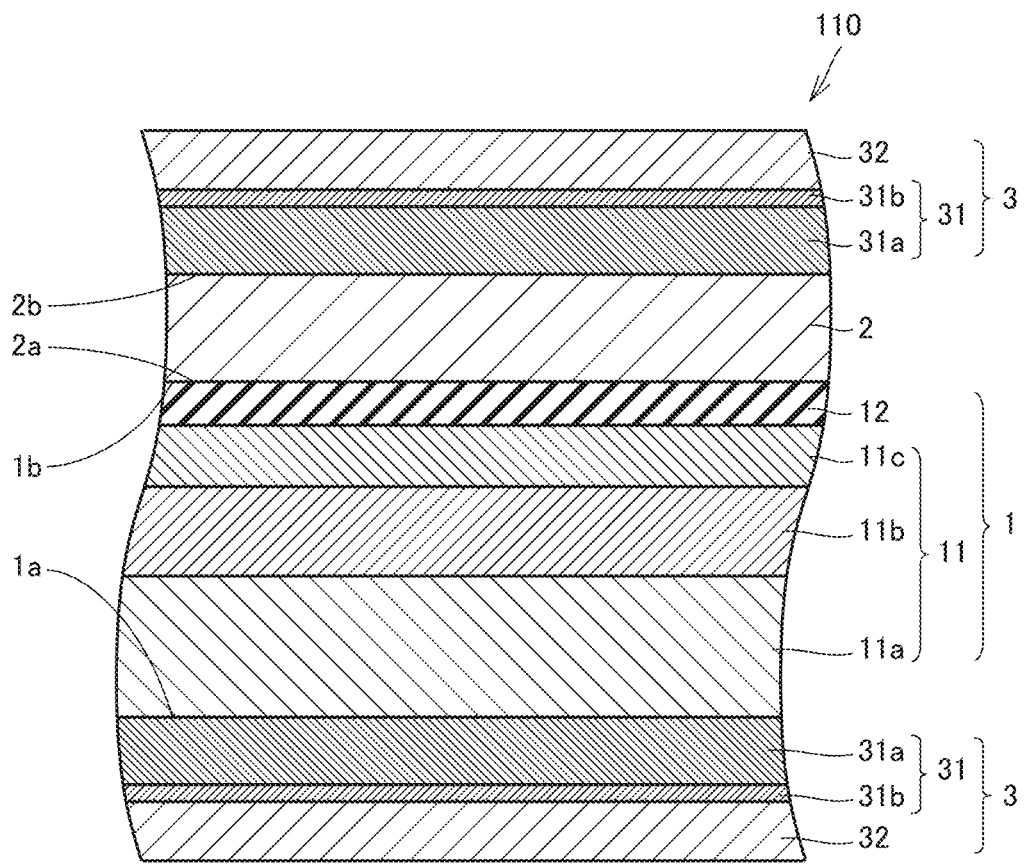
FIG. 7 is a cross sectional view of a superconducting wire 110 according to a comparative example in a cross section parallel to a longitudinal direction thereof.

Effects of Superconducting Wire and Superconducting Coil According to Embodiment The following describes an effect of each of superconducting wire 100 and superconducting coil 200 according to the embodiment in comparison with a comparative example. FIG. 7 is a cross sectional view of a superconducting wire 110 according to the comparative example in a cross section parallel to a longitudinal direction thereof. As shown in FIG. 7, as with superconducting wire 100 according to the embodiment, superconducting wire 110 according to the comparative example includes substrate 1, superconducting layer 2, and coating layers 3.

However, superconducting wire 110 according to the comparative example is different from superconducting wire 100 according to the embodiment in that the configuration of coating layer 3 disposed on first surface 1a and the configuration of coating layer 3 disposed on fourth surface 2b are the same. That is, in superconducting wire 110 according to the comparative example, each of coating layer 3 disposed on first surface 1a and coating layer 3 disposed on fourth surface 2b is constituted of: stabilization layer 31 including sputtering layer 31a and strike plating layer 31b; and protective layer 32. As a result, in superconducting wire 110 according to the comparative example, adhesion strength between substrate 1 and coating layer 3 disposed on first surface 1a is not lower than adhesion strength between superconducting layer 2 and coating layer 3 disposed on fourth surface 2b.

Figure 8:
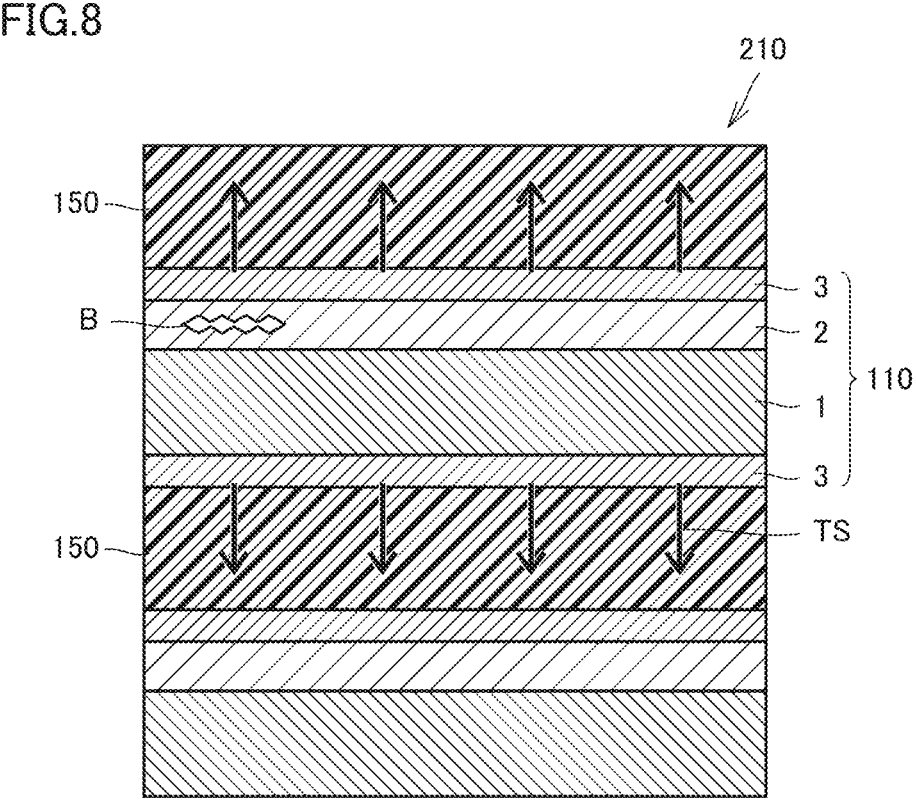
FIG. 8 is a partial cross sectional view of a superconducting coil 210 according to the comparative example.

FIG. 8 is a partial cross sectional view of a superconducting coil 210 according to the comparative example. As shown in FIG. 8, superconducting coil 210 according to the comparative example has the same configuration as that of superconducting coil 200 according to the embodiment except that superconducting wire 110 according to the comparative example is used.

Superconducting coil 210 according to the comparative example is cooled to a very low temperature by liquid nitrogen during an operation. The thermal expansion coefficient of insulator 150 is smaller than the thermal expansion coefficient of each of substrate 1 and superconducting layer 2 as described above. That is, the contraction of insulator 150 by the cooling is smaller than the contraction of superconducting layer 2 by the cooling. As a result, tensile stress TS resulting from the cooling acts on superconducting layer 2. Due to this tensile stress TS, breakage B is caused in superconducting layer 2, with the result that the superconducting property of each of superconducting wire 110 and superconducting coil 210 is deteriorated.

Figure 9:
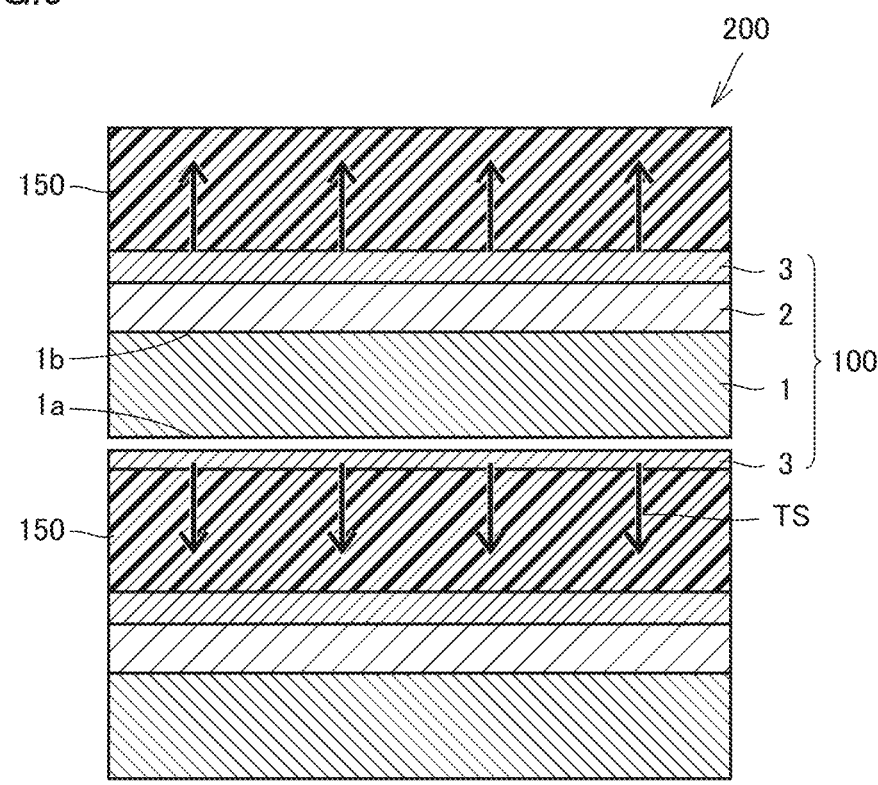
FIG. 9 is a partial cross sectional view of superconducting coil 200 according to the embodiment during cooling.

FIG. 9 is a partial cross sectional view of superconducting coil 200 according to the embodiment during cooling. As shown in FIG. 9, also in superconducting coil 200 according to the embodiment, tensile stress TS is generated during cooling.

However, in the superconducting coil according to the embodiment, since the adhesion strength between substrate 1 and coating layer 3 disposed on first surface 1a is lower than the adhesion strength between superconducting layer 2 and coating layer 3 disposed on fourth surface 2b, substrate 1 and coating layer 3 are detached readily from each other on first surface 1a located opposite to superconducting layer 2 before excessive tensile stress TS acts on superconducting layer 2.

Therefore, according to superconducting wire 100 and superconducting coil 200 according to the embodiment, occurrence of breakage due to the difference in thermal expansion coefficient can be suppressed in superconducting layer 2, whereby the superconducting property can be suppressed from being deteriorated.

When strike plating is directly provided to substrate 1, adhesion strength between substrate 1 and the strike plating layer is very low. Hence, in superconducting wire 100 according to the embodiment, substrate 1 and coating layer 3 are detached from each other very readily on first surface 1a when coating layers 3 have stabilization layers 31, stabilization layer 31 disposed on first surface 1a is constituted of the strike plating layer, and the stabilization layer disposed on fourth surface 2b is constituted of sputtering layer 31a and strike plating layer 31b. Therefore, in this case, occurrence of breakage resulting from a difference in thermal expansion coefficient can be further suppressed in superconducting layer 2, whereby the superconducting property can be further suppressed from being deteriorated.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: substrate; 1a: first surface; 1b: second surface; 11: substrate layer; 11a: first layer; 11b: second layer; 11c: third layer; 12: intermediate layer; 2: superconducting layer; 2a: third surface; 2b: fourth surface; 3: coating layer; 31: stabilization layer; 31a: sputtering layer; 31b: strike plating layer; 32: protective layer; 100, 110: superconducting wire; 150: insulator; 200, 210: superconducting coil; B: breakage; S1: preparing step; S2: coating layer forming step; S3: wire winding step; S4: insulator filling step; S21: stabilization layer forming step; S22: protective layer forming step; T1: first thickness; T2: second thickness; T3: third thickness; T4: fourth thickness; T5: tensile stress.

The invention claimed is:

1. A superconducting wire comprising:
a substrate having a first surface and a second surface opposite to the first surface;
a superconducting layer having a third surface and a fourth surface opposite to the third surface, the superconducting layer being disposed on the substrate such that the third surface faces the second surface; and
respective coating layers disposed on the first surface and the fourth surface, wherein
adhesion strength between the substrate and the coating layer disposed on the first surface is lower than adhesion strength between the superconducting layer and the coating layer disposed on the fourth surface,
the coating layer disposed on the first surface includes a first stabilization layer disposed on the first surface and a first protective layer disposed directly on the first stabilization layer,
the coating layer disposed on the fourth surface includes a second stabilization layer disposed on the fourth surface and a second protective layer disposed directly on the second stabilization layer,
the first stabilization layer and the second stabilization layer are formed of Ag, and
the first protective layer and the second protective layer are formed only of Cu.

2. The superconducting wire according to claim 1, wherein a thickness of the stabilization layer disposed on the first surface is smaller than a thickness of the stabilization layer disposed on the fourth surface.

3. The superconducting wire according to claim 1, wherein
   the stabilization layer disposed on the first surface is constituted of a single layer, and
   the stabilization layer disposed on the fourth surface is constituted of a plurality of layers.

4. The superconducting wire according to claim 3, wherein
   the stabilization layer disposed on the first surface is constituted of a strike plating layer, and
   the stabilization layer disposed on the fourth surface is constituted of a sputtering layer disposed on the fourth surface and a strike plating layer disposed on the sputtering layer.

5. A superconducting coil comprising:
   the superconducting wire recited in claim 1; and
   an insulator having a thermal expansion coefficient larger than a thermal expansion coefficient of the superconducting layer, wherein
   the superconducting wire is wound to have a spiral shape with a space being interposed between windings of the superconducting wire, and
   the space is filled with the insulator.

* * * * *